(12) United States Patent
Higuma et al.

(10) Patent No.: US 9,335,150 B2
(45) Date of Patent: May 10, 2016

(54) CONDUCTOR LENGTH MEASUREMENT DEVICE AND CONDUCTOR LENGTH MEASUREMENT METHOD

(75) Inventors: Toshiyasu Higuma, Tokyo (JP); Naoyuki Hibara, Tokyo (JP); Tomoaki Gyota, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 59 days.

(21) Appl. No.: 13/816,539

(22) PCT Filed: Jan. 25, 2011

(86) PCT No.: PCT/JP2011/051371
§ 371 (c)(1),
(2), (4) Date: Feb. 12, 2013

(87) PCT Pub. No.: WO2012/026138
PCT Pub. Date: Mar. 1, 2012

(65) Prior Publication Data
US 2013/0134991 A1    May 30, 2013

(30) Foreign Application Priority Data
Aug. 23, 2010 (JP) .................. 2010-186644

(51) Int. Cl.
*G01R 7/02* (2006.01)
*G01B 7/02* (2006.01)

(52) U.S. Cl.
CPC ........................................ *G01B 7/02* (2013.01)

(58) Field of Classification Search
CPC .......... G01B 7/02; G01B 17/04; G01B 7/026; F24F 1/26; F24F 1/32; F25B 45/00; G01F 23/0069; G01R 31/11; G01R 27/04; G01R 31/008; G01R 31/088; G01R 31/021; G01R 31/083; G01R 31/3191; G01R 31/31924; G01R 27/06; H04B 3/46; G01N 2291/02854; F15B 15/2823
USPC ........... 324/635, 33, 636, 644, 661, 662, 520, 324/667, 674, 671, 76.19, 76.1, 633, 637, 324/642, 645, 653, 681; 702/75, 76, 106, 702/97, 158, 159, 122, 155
See application file for complete search history.

(56) References Cited

U.S. PATENT DOCUMENTS 3,728,620 A * 4/1973 Heins .......................... 324/520
6,307,380 B1   10/2001 Hirai et al.
(Continued)

FOREIGN PATENT DOCUMENTS

| EP | 0160356 | * | 2/1985 | ............ G01B 7/04 |
| JP | 04-134274 A | | 5/1992 | |
| JP | 07-294233 A | | 11/1995 | |
| JP | 2000-131004 A | | 5/2000 | |
| JP | 2007-085892 A | | 4/2007 | |

OTHER PUBLICATIONS

National Semiconducto LM566C VOltage COntrolled Oscillator Data Sheet—Feb. 1995.*
(Continued)

*Primary Examiner* — Arleen M Vazquez
*Assistant Examiner* — Lee Rodak
(74) *Attorney, Agent, or Firm* — Posz Law Group, PLC

(57) ABSTRACT

Probes of a conductor length measurement device are connected to piping, and an output voltage is applied to the piping through the probes. A frequency spectrum curve is subsequently calculated by subjecting a voltage signal to FFT. Resonant frequencies of the piping are then determined from this frequency spectrum curve, and the total length of the piping is calculated on the basis of the resonant frequencies. The total length of the piping can therefore be easily measured without the need to install, for example, any measurement instruments at branch terminals.

12 Claims, 18 Drawing Sheets

(56) References Cited

U.S. PATENT DOCUMENTS

2004/0015311 A1* 1/2004 Furse et al. ............. 702/108
2010/0063772 A1* 3/2010 Kim et al. ............... 702/159

OTHER PUBLICATIONS

Office Action mailed Mar. 4, 2014 issued in corresponding JP patent application No. 2012-530547 (and English translation).

"Impedance Sokutei Handbook" Agilent Technologies Japan, Ltd. Japan. 2003.

International Search Report of the International Searching Authority mailed May 10, 2011 for the corresponding international application No. PCT/JP2011/051371 (with English translation).

Office Action mailed Sep. 28, 2014 issued in corresponding CN patent application No. 201180040620.2 (and English translation).

Office Action dated Apr. 20, 2015 issued in corresponding CN patent application No. 201180040620.2 (and partial English translation).

* cited by examiner

CONDUCTOR LENGTH MEASUREMENT DEVICE AND CONDUCTOR LENGTH MEASUREMENT METHOD

CROSS REFERENCE TO RELATED APPLICATIONS

This application is a U.S. national stage application of PCT/JP2011/051371 filed on Jan. 25, 2011, and claims priority to, and incorporates by reference, Japanese Patent Application No. 2010-186644 filed on Aug. 23, 2010.

TECHNICAL FIELD

The present invention relates to a conductor length measurement device and conductor length measurement method, and more particularly to a conductor length measurement device and conductor length measurement method for measuring the total length of a branching conductor.

BACKGROUND ART

In air conditioner systems installed in large-scale structures as typified by office buildings, multiple indoor equipment positioned on each floor or in each section of a floor are for example connected via coolant piping to outdoor equipment installed on the roof and/or the like. The coolant piping of this kind of air conditioning system typically branches multiple times from the outdoor equipment to the indoor equipment. Consequently, a measurement device such as that indicated in Patent Literature 1, for example, is necessary in order to measure the total length of the coolant piping.

The device indicated in Patent Literature 1 detects the time needed for vibrations to be transmitted along coolant piping by having vibrations, generated by transmitters positioned at each end of coolant piping with multiple branches, received by receivers similarly positioned at each end of the coolant piping. Furthermore, the total length of the coolant piping is measured based on the detected time.

PRIOR ART LITERATURE

Patent Literature

Patent Literature 1: Unexamined Japanese Patent Application Kokai Publication No. 2007-85892.

DISCLOSURE OF THE INVENTION

Problem to be Solved by the Invention

In order to measure the total length of the coolant piping using the above-described measurement device, it is necessary to prepare ahead by surveying in advance the junctions at which the coolant piping branches and to position the above-described transmitters and receivers respectively at the ends of the branches. Consequently, when the indoor equipment is positioned on the ceiling and/or the like, this advance preparation can be predicted to be difficult and complicated.

In consideration of the foregoing, it is an object of the present invention to easily measure the total length of a conductor having junctions.

Means for Solving the Problem

In order to achieve the above object, the conductor measurement device of the present invention comprises:

a measurement means for measuring frequency characteristics of a coupled conductor by impressing a voltage to the conductor; and a computation means for specifying resonant frequencies of the conductor from the frequency characteristics, and computing the total length of the conductor based on the resonant frequencies.

Effects of the Invention

With the present invention, it is possible to measure the total length of a conductor based on resonant frequencies specified by impressing an electrical voltage to the conductor. Through this, it is possible to easily measure the total length of the conductor without needing processes such as attaching measurement instruments to each and every branch of the conductor.

MODE FOR CARRYING OUT THE INVENTION

First Preferred Embodiment

Figure 1:
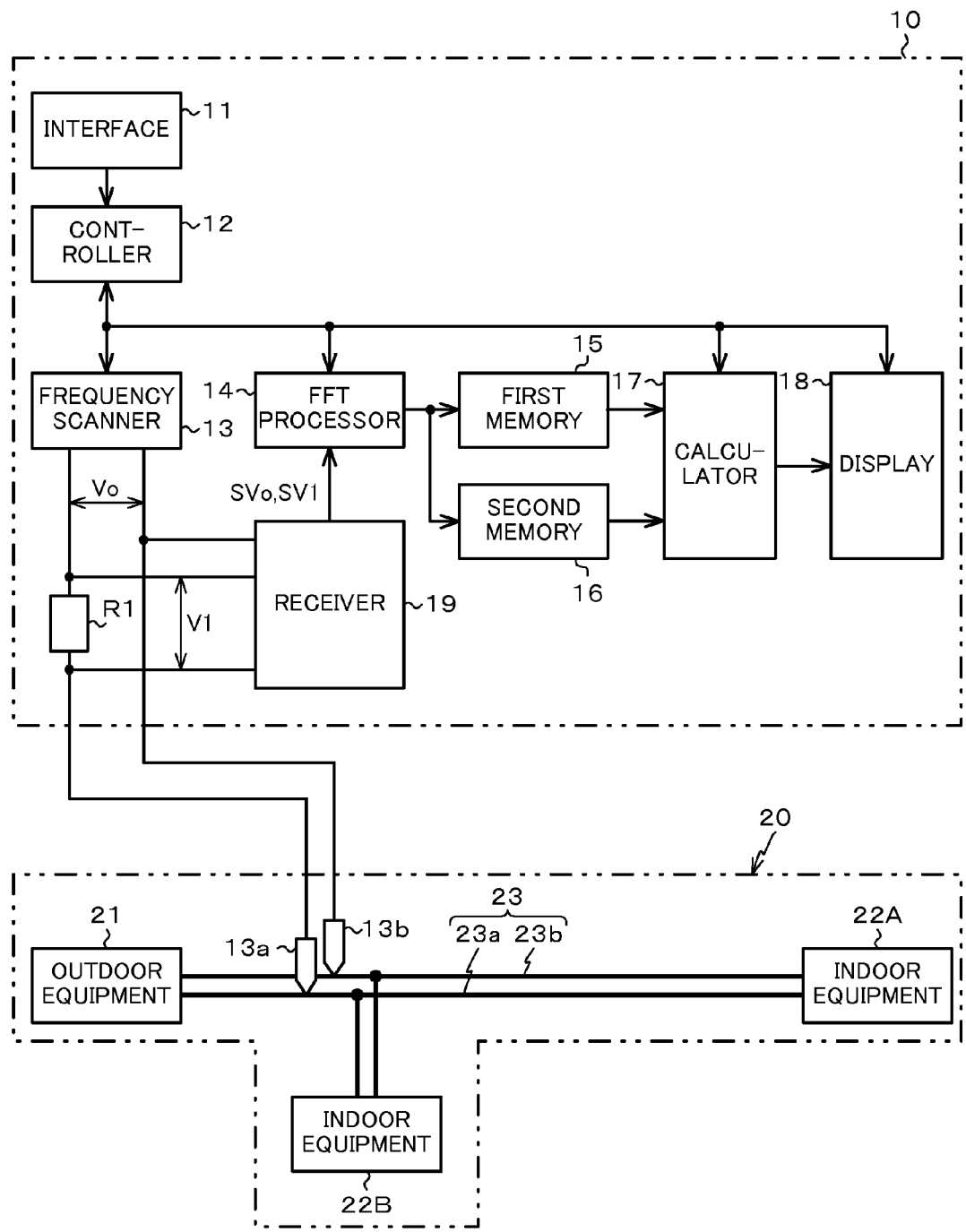
FIG. 1 is a block diagram of a conductor length measurement device according to a first preferred embodiment of the present invention.

A first preferred embodiment of the present invention is explained below with reference to the drawings. FIG. 1 is a block diagram of a conductor length measurement device 10 installed on an air conditioning system 20 as a measurement target. The conductor length measurement device 10 is a device for measuring the total length of piping 23 comprising the air conditioning system 20.

As shown in FIG. 1, the air conditioning system 20 has outdoor equipment 21 installed on the roof of an office building, for example, and two pieces of indoor equipment 22A and 22B installed in a residential area of this office building. Furthermore, the outdoor equipment 21 and the indoor equipment 22A and 22B are connected by piping 23 composed of supply copper piping 23a through which coolant flows from the outdoor equipment 21 to the indoor equipment 22A and 22B, and return copper piping 23b through which coolant flows from the indoor equipment 22A and 22B to the outdoor equipment 21.

The copper piping 23a and 23b comprising the piping 23 are each covered by an insulating material such as foamed urethane and/or the like whose dielectric constant is virtually 1. In addition, in the air conditioning system 20 the supply copper piping 23a and the return copper piping 23b comprising the piping 23 are arranged so as to be parallel. In this preferred embodiment, one out of the copper piping 23a and the copper piping 23b is piping for liquids and the other is piping for gases having a larger diameter than the piping for liquids.

As shown in FIG. 1, the conductor length measurement device 10 possesses an interface 11, a controller 12, a frequency scanner 13, an FFT (Fast Fourier Transform) processor 14, a first memory 15, a second memory 16, a calculator 17, a display 18, a receiver 19 and a resistor R1.

The frequency scanner 13 is a digital frequency synthesizer having a commonly known internal impedance and also having a power source for impressing an output voltage Vo to the measurement target. This frequency scanner 13 is connected to the supply copper piping 23a via the resistor R1 and a probe 13a, and is connected to the return copper piping 23b via a probe 13b. Through this, the resistor R1 and the piping 23 are connected in a series.

Connection of the probes 13a and 13b is accomplished at a part at which the copper piping 23a and 23b is exposed from the insulating material. For example, in an air conditioning system used in an office building and/or the like, the conductor length measurement device 10 can conceivably be connected to the copper piping 23a and 23b near the outdoor equipment 21 or in a mechanical room.

Figure 2:
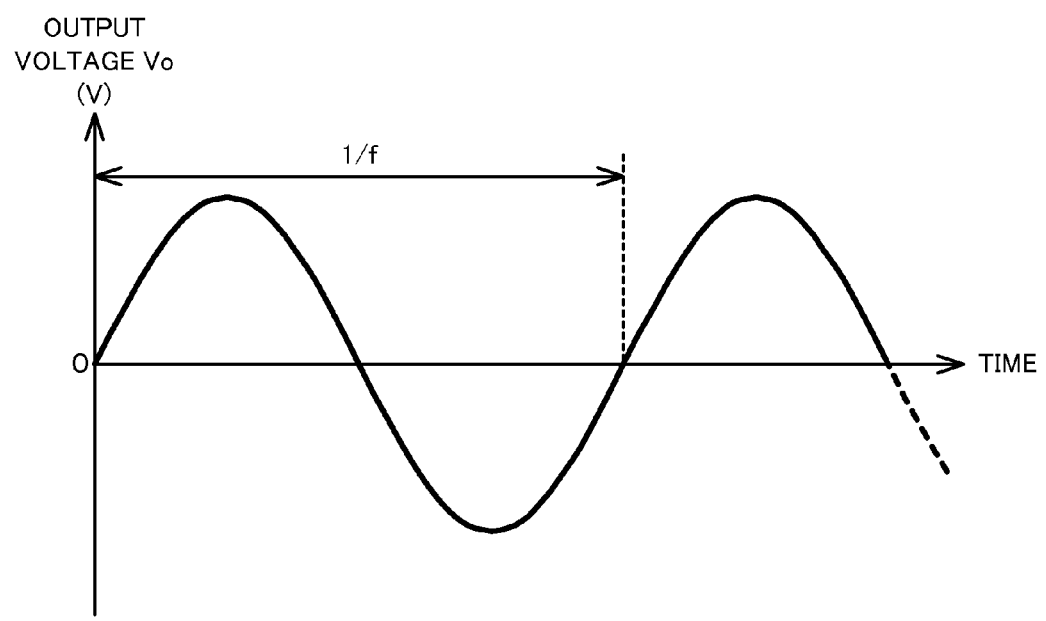
FIG. 2 is a graph showing the change over time to the output voltage output from a frequency scanner.

The frequency scanner 13 impresses an output voltage Vo having a frequency of f between the resistor R1 and the measurement target connected to the probes 13a and 13b. FIG. 2 is a drawing showing the change over time to the output voltage Vo. As shown in FIG. 2, the waveform of the output voltage Vo is a sinusoidal wave with a period of 1/f. This output voltage Vo is split so as to be proportional to the impedance of the measurement target and the resistor R1 connected in series.

The receiver 19 detects the output voltage Vo of the frequency scanner 13 and the potential difference V1 across the two ends of the resistor R1. Furthermore, voltage signals SVo and SV1 corresponding to the detected output voltage Vo and the potential difference V1 are output to the FFT processor 14.

The FFT processor 14 computes the voltage strength for each frequency (frequency spectrum) for the voltage signals SVo and SV1 by executing an FFT process on the input voltage signals SVo and SV1.

Figure 3:
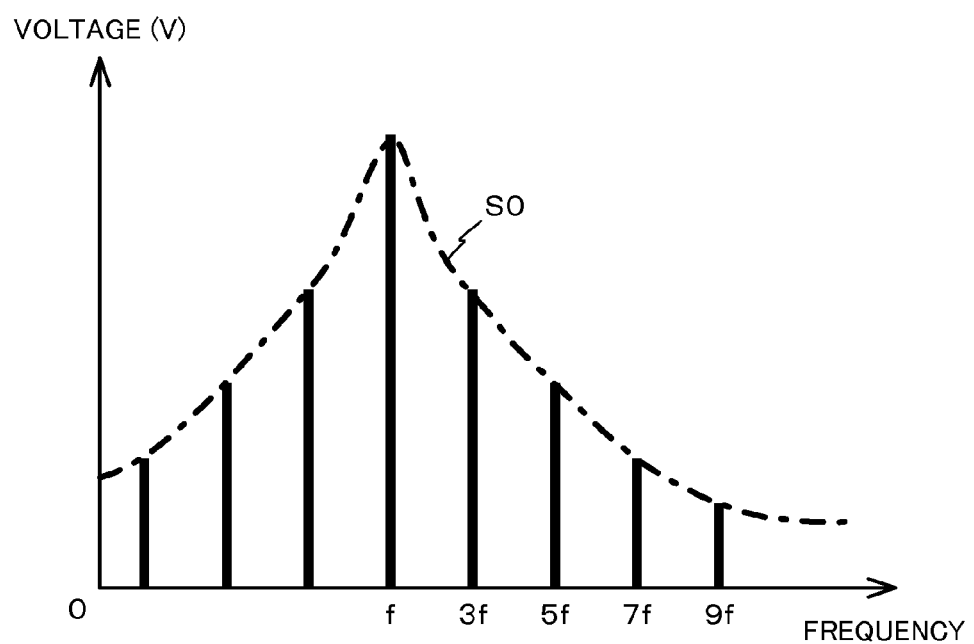
FIG. 3 is a graph showing the results when an FFT process is executed on a voltage signal corresponding to the output voltage of the frequency scanner.

FIG. 3 shows the results of executing the above-described FFT process on the voltage signal SVo corresponding to the output voltage Vo with the waveform shown in FIG. 2. As shown by the bar graph in FIG. 3, for example the voltage signal SVo corresponding to the output voltage Vo whose waveform is sinusoidal includes numerous high harmonic components whose frequencies are odd multiples of f. The FFT processor 14 computes the frequency spectrum curve showing the voltage level at each frequency based on the results of the FFT process on the voltage signals SVo and SV1. For example, when the frequency spectrum curve is computed based on the process results shown in FIG. 3, the frequency spectrum curve S0 indicated by the dotted line in the drawing is obtained.

Both the first memory 15 and the second memory 16 have memory media such as RAM (Random Access Memory) or EPRAM (Erasable Programmable Read Only Memory). The first memory 15 and the second memory 16 store process results from the FFT processor 14.

The calculator 17 computes the resonant frequencies of the piping 23 using the process results stored in the first memory 15 and the second memory 16. Furthermore, the total length of the piping is measured based on the computed resonant frequencies.

The display 18 displays the computation results from the calculator 17.

The control unit 12 is composed of a CPU (Central Processing Unit), and RAM and/or the like used as the CPU's work space. This control unit 12 provides overall control of the above-described frequency scanner 13, FFT processor 14, calculator 17 and display 18 based on commands from a user communicated via the interface 11.

Next, the usage method and measurement actions of the conductor length measurement device 10 composed as described above are explained.

When the conductor length measurement device 10 is to take a measurement, first the probes 13a and 13b of the conductor length measurement device 10 are respectively connected to the two ends of a resistor R2 of known resistance. Furthermore, a measurement preparation process command is input to the controller 12 via the interface 11.

Upon receiving the measurement preparation process command, the controller 12 commands the frequency scanner 13 to impress an output voltage Vo of frequency f. Through this, the output voltage Vo shown in FIG. 2 is impressed to the resistor R1 and the resistor R2, which are connected in series.

Next, the controller 12 commands an execution of the FFT process by the FFT processor 14. Through this, when the output voltage Vo of frequency f is impressed to the FFT processor 14, an FFT process of the voltage signal SV1 output from the receiver 19 is executed on the electric potential V1 across the two ends of the resistor R1.

Next, the controller 12 commands the frequency scanner 13 to impress an output voltage Vo of frequency f+Δf. Through this, when the output voltage Vo of frequency f+Δf is impressed, the FFT processor 14 executes an FFT process on the voltage signal SV1 output from the receiver 19 in accordance with the potential difference V1 across the two ends of the resistor R1.

Figure 5:
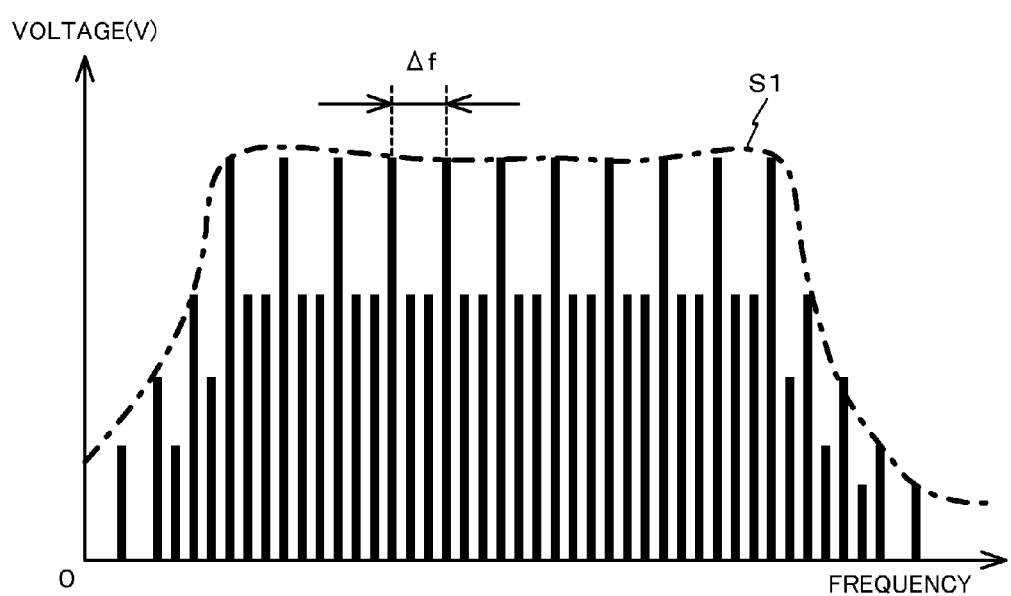
FIG. 5 is a graph for explaining the voltage level of the base wave component and the high harmonic wave component of a voltage signal corresponding to the potential difference across the two ends of the resistor.

Following this, the controller 12 successively commands the frequency scanner 13 to impress output voltages Vo of frequencies f+n·Δf. Here, n is an integer of two or greater. Through this, when output voltages Vo of frequencies f+n·Δf are impressed, the FFT processor 14 successively executes FFT processes on the voltage signal SV1 output from the receiver 19 in accordance with the potential difference V1 across the two ends of the resistor R1. As a result, the properties displayed by the bar graph in FIG. 5 are successively computed. Furthermore, the computation results are successively stored in the first memory 15. The bar graph of FIG. 5 shows the voltages of the basic wave component and the high harmonic component of the voltage signal SV1 corresponding to the potential difference V1 across the two ends of the resistor R1.

When execution of the FFT processes for each of the voltage signals SV1 corresponding to the potential difference V1 across the two ends of the resistor R1 concludes, the controller 12 commands computation of the frequency spectrum curve S1 by the calculator 17. The frequency spectrum curve S1 is a curve showing the voltage level at each frequency for the voltage signal SV1 when the resistor R2 is the measurement target. The calculator 17 computes the frequency spectrum curve S1 using the results of the FFT process stored in the first memory 15.

By accomplishing the above-described process, once generation of information relating to the frequency spectrum curve S1 is concluded, the probes 13a and 13b of the conductor length measurement device 10 are removed from the resistor R2. Next, as shown in FIG. 1, the probes 13a and 13b are respectively connected to the supply copper piping 23a and the return copper piping 23b comprising the piping 23. Furthermore, a measurement process command is input to the controller 12 via the interface 11.

When the measurement command is received, the controller 12 commands the frequency scanner 13 to impress an output voltage Vo of frequency f. Through this, the output voltage Vo shown in FIG. 2 is impressed to the resistor R1 and the piping 23, which are connected in series.

Next, the controller 12 commands execution of an FFT process by the FFT processor 14. Through this, when the output voltage Vo of frequency f is impressed, an FFT process for the voltage signal SV1 output from the receiver 19 in accordance with the potential difference V1 across the two ends of the resistor R1 is executed by the FFT processor 14.

Next, the controller 12 commands the frequency scanner 13 to impress an output voltage Vo of frequency f+Δf. Through this, when the output voltage Vo of frequency f+Δf is impressed, an FFT process for the voltage signal SV1 output from the receiver 19 in accordance with the potential difference V1 across the two ends of the resistor R1 is executed by the FFT processor 14.

Following this, the controller 12 successively commands the frequency scanner 13 to impress output voltages Vo of frequencies f+n·Δf. Through this, when the output voltages Vo of frequencies f+n·Δf are impressed, FFT processes for the voltage signals SV1 output from the receiver 19 in accordance with the potential differences V1 across the two ends of the resistor R1 are executed by the FFT processor 14. Furthermore, the FFT process results are successively stored in the second memory 16.

When execution of FFT processes for the respective voltage signals SV1 in accordance with the potential differences V1 across the two ends of the resistor R1 concludes, the controller 12 commands computation of the frequency spectrum curve S2 by the calculator 17. The frequency spectrum curve S2 is a curve showing the voltage levels at various frequencies for the voltage signal SV1 when the piping 23 is the measurement target.

Figure 6:
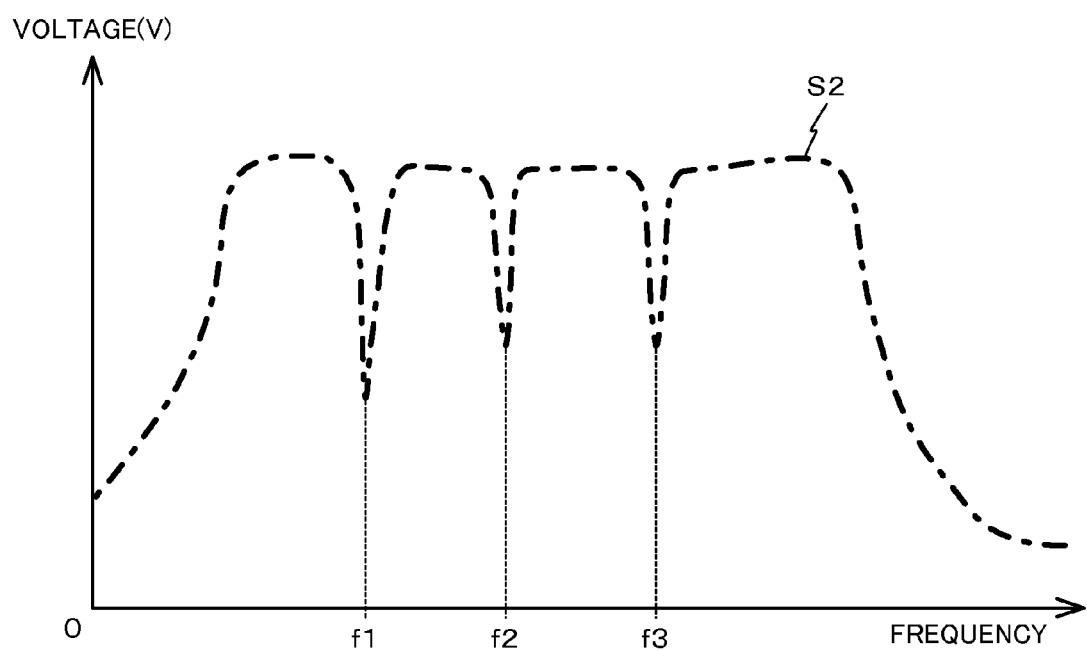
FIG. 6 is a drawing showing a frequency spectrum curve.

The calculator 17 computes the frequency spectrum curve S2 using the results of the FFT processes stored in the second memory 16. FIG. 6 shows the frequency spectrum curve S2. As shown in FIG. 6, when the conductor length measurement device 10 is connected to the piping 23, the voltage level at specific frequencies becomes lower in accordance with the shape of the piping 23.

When computation of the frequency spectrum curve S2 concludes, the controller 12 commands computation of the total length of the piping 23 by the calculator 17. Upon receiving the computation command from the controller 12, the calculator 17 executes a computation process for the total length of the piping 23. The calculator 17 first computes a characteristic curve S3 shown in FIG. 7 by subtracting the voltage levels indicated by the frequency spectrum curve S1 (see FIG. 5) from the voltage levels indicated by the frequency spectrum curve S2 (see FIG. 6). This characteristic curve S3 is a curve indicating the frequency characteristics of the piping 23.

Figure 7:
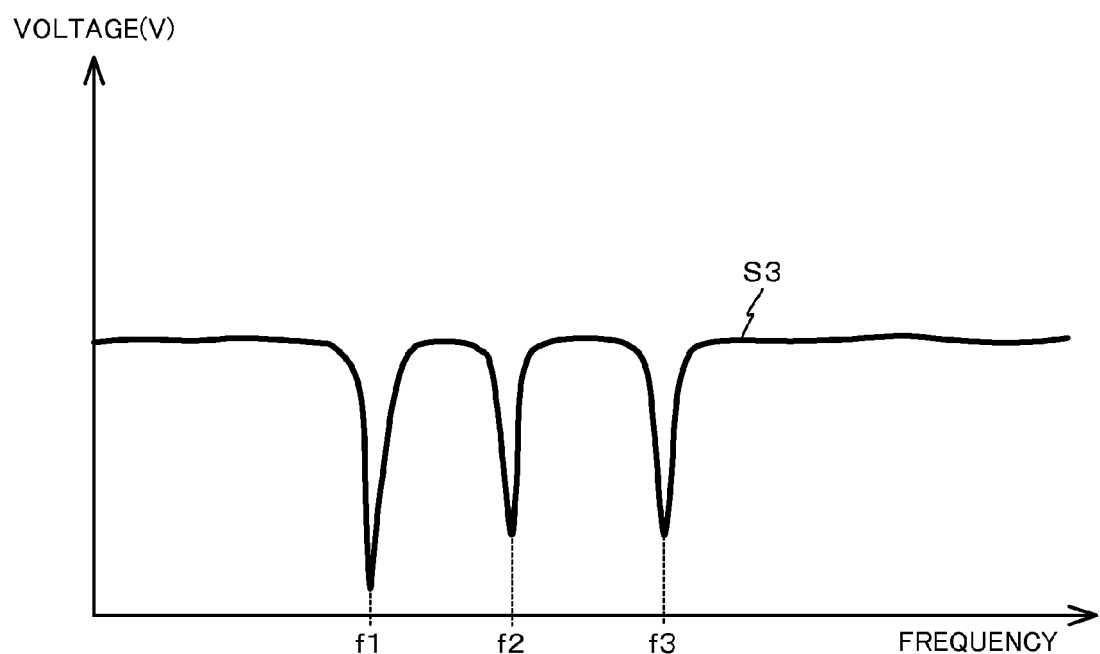
FIG. 7 is a drawing showing a characteristic curve indicating frequency characteristics of piping.

Next, the calculator 17 specifies resonant frequencies of the piping 23 based on the characteristic curve S3. When the frequency of the voltage impressed to the piping 23 matches a resonant frequency of the piping 23, the voltage level across the two ends of the resistor R1 decreases. Hence, the calculator 17 specifies frequencies corresponding to minima of the characteristic curve S3. As shown in FIG. 7, frequencies f1, f2 and f3 are specified as frequencies corresponding to the minima of the characteristic curve S3.

Next, the calculator 17 computes the total length of the piping 23 using equation (1) below. Here, $f_n$ are frequencies corresponding to minima of the characteristic curve, that is to say resonant frequencies of the piping 23. In addition, $f_W$ is the frequency range.

[Formula 1]

$$l_1 + l_2 + l_3 = \frac{300}{f_w^2} \sum f_n + \frac{150}{f_w} \qquad (1)$$

The above equation (1) will now be explained. The electric potential V1 across the two ends of the resistor R1 when the output voltage Vo is impressed between the resistor R1 and the piping 23, which are connected in series, by the frequency scanner 13 is expressed by the following equation (2) when Zt is the impedance of the piping 23, r1 is the resistance of the resistor R1 and I is the current flowing through the resistor R1. Consequently, the impedance Zt of the piping can be expressed by the following equation (3).

$$V1 = R \times I \qquad (2)$$
$$= R \times Vo/(R + Zt)$$

$$Zt = R \times (Vo - V1)/V1 \qquad (3)$$

Accordingly, when the electric potential V1 across the two ends of the resistor R1 is measured when the output voltage Vo is impressed, it is possible to find the impedance of the piping 23 as a measurement target. Hence, with this preferred embodiment, the total length of the piping 23 is computed using a computational equation guided from the lossless line theory equation applied to piping of length l shown in equation (4) below. Zt in equation (4) indicates the impedance with the outdoor equipment 21 as a reference. In addition, $Z_0$ indicates the characteristic impedance of the piping and Zr indicates the impedance connected to both ends of the piping. In addition, l indicates the total length of the piping. In addition, β is 2π divided by the wavelength λ of the output voltage Vo (β=2π/λ).

[Formula 2]

$$Zt = Z_0 \frac{Zr + jZ_0 \tan\beta l}{Z_0 + jZr\tan\beta l} \quad (4)$$

Figure 8:
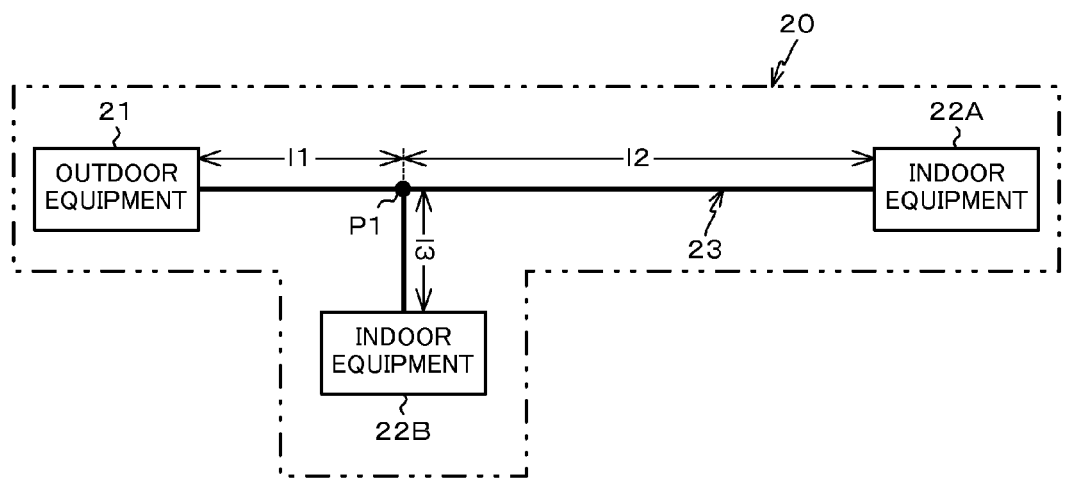
FIG. 8 is a drawing for defining the length of each branch of the piping.

For convenience, as shown in FIG. 8, the following explanation is for a case when measuring is of the total length of piping branching into two at branch point P1. The total length of this piping is l, the length from the branch point P1 to the outdoor equipment is l1, the length from the branch point P1 to the indoor equipment 22A is l2 and the length from the branch point P1 to the indoor equipment 22B is l3.

As shown in FIG. 1, the piping 23 is piping composed of supply copper piping 23a and return copper piping 23b installed in parallel. Hence, the supply copper piping 23a and the return copper piping 23b is short-circuited by the outdoor equipment 21 and the indoor equipment 22A and 22B. Consequently, the value of the impedance Zr connected to the terminus in the above equation (4) is zero. Accordingly, the above equation (4) can be developed as in equation (5) below.

[Formula 3]

$$Zt = jZ_0 \frac{\tan\beta l_2 \times \tan\beta l_3 + \tan\beta l_1 \times \tan\beta l_2 + \tan\beta l_1 \times \tan\beta l_3}{\tan\beta l_2 + \tan\beta l_3 - \tan\beta l_1 \times \tan\beta l_2 \times \tan\beta l_3} \quad (5)$$

When the frequency of the output voltage Vo matches a resonant frequency of the piping 23, the impedance Zt of the piping 23 diverges. Accordingly, when the frequency of the output voltage Vo is f1, f2 or f3, the numerator on the right side in above equation (5) becomes infinitely large or the denominator goes to zero. However, in above equation (5), because the numerator becomes infinitely large when the numerator becomes infinitely large, the denominator going to zero is the condition for the impedance Zt to diverge. Accordingly, when the frequency of the output voltage Vo is f1, f2 or f3, the following equation (6) is established.

[Formula 4]

$$\tan\beta l_2 + \tan\beta l_3 - \tan\beta l_1 \times \tan\beta l_2 \times \tan\beta l_3 = 0 \quad (6)$$

Furthermore, the above equation (6) can be transformed as shown in equation (7), equation (8) and equation (9) below.

[Formula 5]

$$\frac{1}{\tan\beta l_2} + \frac{1}{\tan\beta l_3} - \tan\beta l_1 = 0 \quad (7)$$

[Formula 6]

$$-\tan\left(\beta l_2 + \frac{\pi}{2}\right) - \tan\left(\beta l_3 + \frac{\pi}{2}\right) - \tan\beta l_1 = 0 \quad (8)$$

[Formula 7]

$$\tan\left(\beta l_2 + \frac{\pi}{2}\right) + \tan\left(\beta l_3 + \frac{\pi}{2}\right) + \tan\beta l_1 = 0 \quad (9)$$

As shown in equation (9) above, the left side expressed as a sum of the trigonometric function tan is the case in which the three terms are such that the β of divergence satisfy the conditions shown in equations (10) to (12) below. Furthermore, equations (10) to (12) lead to equations (13) to (15).

[Formula 8]

$$\beta l_2 + \frac{\pi}{2} = n\pi + \frac{\pi}{2} \quad (10)$$

[Formula 9]

$$\beta l_3 + \frac{\pi}{2} = n\pi + \frac{\pi}{2} \quad (11)$$

[Formula 10]

$$\beta l_1 = n\pi + \frac{\pi}{2} \quad (12)$$

[Formula 11]

$$\beta_n = \frac{\pi}{l_2} n = A_n \quad (13)$$

[Formula 12]

$$\beta_n = \frac{\pi}{l_3} n = B_n \quad (14)$$

[Formula 13]

$$\beta_n = \frac{\pi}{l_1} n + \frac{\pi}{2l_1} = C_n \quad (15)$$

The above-described equations (13) to (15) show the conditions for β when the terms in equation (9) above diverge. For example, in FIG. 9 the change in the value of $\tan\beta l_1$ when $l_1$ is 7.4 m is indicated by the dashed line. In addition, the change in the value of $\tan(\beta l_2 + \pi/2)$ when $l_2$ is 3.3 m is indicated by the double-broken line. In addition, the change in the value of $\tan(\beta l_3 + \pi/2)$ when $l_3$ is 5.71 m is indicated by the broken line. In addition, the change in the value of the left side of equation (9) is indicated by the solid line.

Figure 9:
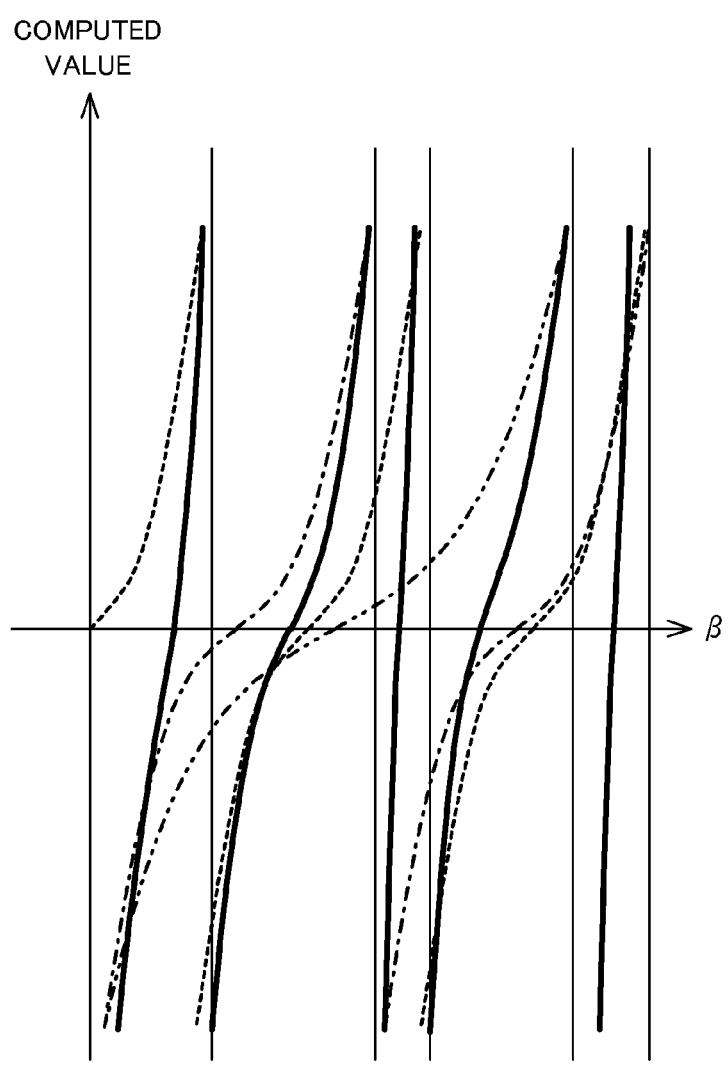
FIG. 9 is a drawing for explaining the equation for computing total length.

As can be seen be referencing FIG. 9, the value of β when the left side of equation (9) goes to zero lies between the values of β when the value of $\tan\beta l_1$, $\tan(\beta l_2 + \pi/2)$ or $\tan(\beta l_3 + \pi/2)$ diverges. Consequently, for example when 0, $A_1$, $A_2$, $B_1$, $C_1$, $B_2$, $A_3$, $A_4$, ... are arranged with $A_n$, $B_n$, and $C_n$ in ascending order, the solution $\beta_n$ of β is given by the following equation.

[Formula 14]

$$\beta_n = \frac{0 + A_1}{2}, \frac{A_1 + A_2}{2}, \frac{A_2 + B_1}{2}, \ldots \quad (16)$$

The sum of $\beta_n$ given by the above-described equation (16) is given by the following equation (17).

[Formula 15]

$$\sum \beta_n = \frac{0 + A_1}{2} + \frac{A_1 + A_2}{2} + \frac{A_2 + B_1}{2} + \ldots \quad (17)$$

$$= \sum A_n + \sum B_n + \sum C_n$$

$$= \sum_{n=0}^{N_2} \frac{\pi}{l_2} n + \sum_{n=0}^{N_3} \frac{\pi}{l_3} n + \sum_{n=0}^{N_1} \left(\frac{\pi}{l_1} n + \frac{\pi}{2l_1}\right)$$

Consider the measurement range for resonant frequencies stipulating the range of $N_1$, $N_2$ and $N_3$ in equation (17) above. When β is at least zero and not greater than W (0≤β≤W), $N_1$, $N_2$ and $N_3$ are respectively given by the following equations (18), (19) and (20).

[Formula 16]
$$N_1 = \frac{W}{\pi}l_1 - 1 \quad (18)$$

[Formula 17]
$$N_2 = \frac{W}{\pi}l_2 \quad (19)$$

[Formula 18]
$$N_3 = \frac{W}{\pi}l_3 \quad (20)$$

Accordingly, from equations (18) to (20) and the formula for the sum of an arithmetic progression, equation (17) can be transformed into equation (21) below.

[Formula 19]
$$\sum \beta_n \left(0 + \frac{\pi}{l_2}N_2\right) \times N_2 \times \frac{1}{2} + \\ \left(0 + \frac{\pi}{l_3}N_3\right) \times N_3 \times \frac{1}{2} + \left(\frac{\pi}{2l_1} + \frac{\pi}{l_3}N_1 + \frac{\pi}{2l_1}\right) \times N_1 \times \frac{1}{2} = \\ \frac{W^2}{2\pi}l_2 + \frac{W^2}{2\pi}l_3 + \frac{\pi}{2l_1}\left(\frac{W}{\pi}l_1 - 1\right)\frac{W}{\pi}l_1 = \frac{W^2}{2\pi}(l_1 + l_2 + l_3) - \frac{W}{2} \quad (21)$$

From the above, the estimation equation showing the total length $l_1+l_2+l_3$ of the piping 23 is indicated by equation (22) below, which is obtained by transforming above-described equation (21). Furthermore, when $\pi \cdot f/150$ is substituted for $\beta$ and $\pi \cdot f_W/150$ is substituted for W in equation (22) below, the above-described equation (1) is obtained. In addition, the general form of equation (1) is shown in equation (23) below.

[Formula 20]
$$l_1 + l_2 + l_3 = \left(\sum \beta + \frac{W}{2}\right)\frac{2\pi}{W^2} = \frac{2\pi}{W^2}\sum \beta + \frac{\pi}{W} \quad (22)$$

[Formula 21]
$$l_1 + l_2 + l_3 \ldots + l_m = \frac{300}{f_w^2}\sum f_n + \frac{p \cdot 150}{f_w} \quad (23)$$

where p is an indicator of the number of branch points PN.

Upon computing the total length of the piping 23 using the above-described equation (1), the calculator 17 outputs the computation results to the display 18.

When the computation results are output from the calculator 17, the controller 12 displays the computation results on the display 18. Through this, the total length of the piping 23 is displayed on the display 18.

As explained above, with this preferred embodiment the probes 13a and 13b of the conductor length measurement device 10 are connected to the piping 23 and an output voltage Vo is impressed to the piping 23 via these probes 13a and 13b. Next, an FFT process is executed on the voltage signal SV1, and through this the frequency spectrum curve S2 is computed. Furthermore, resonant frequencies of the piping 23 are specified from this frequency spectrum curve S2 and the computation shown in above-described equation (1) is executed for these resonant frequencies, and through this the total length of the piping 23 is computed. Consequently, it is possible to easily measure the total length of the piping 23 without knowing the layout of the piping and placing measuring instruments, for example, at the terminus of each branch.

With this preferred embodiment, the total length of the piping 23 is measured based on the resonant frequencies of the piping 23. Through this, it is possible to measure the total length of the piping 23 with sufficient precision even when high harmonic components are contained in the output voltage Vo. Consequently, it is possible to use an inexpensive device as the power supply for outputting the output voltage Vo.

By using the conductor length measurement device 10 according to this preferred embodiment, it is possible to estimate the volume of the piping of the air conditioning equipment based on the total length of the piping. Through this, it is possible to easily estimate the necessary amount of additional coolant in maintenance and/or the like of the air conditioning equipment, for example.

By using the conductor length measurement device 10 according to this preferred embodiment, it is possible to measure the total length of the piping 23 with good precision without understanding the layout of the piping 23 through a layout diagram and/or the like of the piping 23. Consequently, for example even when a diagram and/or the like of air conditioning equipment does not exist, it is possible to measure the total length of the piping 23 with good precision and it is possible to easily accomplish effective equipment maintenance.

With this preferred embodiment, the case in which the measurement target of the conductor length measurement device 10 is the piping 23 was explained. However, this is intended to be illustrative and not limiting, for it is also possible to measure the total length of electric wiring, communication wiring and/or the like by using the conductor length measurement device 10.

Typically, some kind of electrical equipment is connected to the end of electrical wiring, communication wiring and/or the like. Consequently, the value of the impedance Z1 at the end of the electrical wiring or communication wiring is determined by the connected electrical equipment. When this impedance Z1 matches the characteristic impedance Z2 of the electric wiring, reflection caused by mismatching of the impedances is not generated, so no resonance occurs. In this case, it is impossible to measure the total length of the conductor using the conductor length measurement device 10 according to this preferred embodiment.

However, it is rare for the impedance of the electric wiring or communication wiring and the impedance of the electrical equipment to match. Consequently, it is conceivable that the total length of the electric wiring or communication wiring can be measured with good precision by using the conductor length measurement device 10 according to this preferred embodiment.

The dielectric constant of insulators comprising vinyl electric wiring used as electrical wiring or communication wiring is around 3. In addition, the resonant frequencies of electric wiring and/or the like become low frequencies relative to the total length as a result of receiving the effects of the wavelength compression ratio. Consequently, in order to accurately measure the total length of electric wiring and/or the like, a correction that takes into consideration the dielectric constant of the insulator covering the conductor is necessary. For example, the total length of a conductor covered by an insulator whose effective dielectric constant is around 3 must be corrected by dividing the total length actually measured by the square root of the dielectric constant (=1.7).

Second Preferred Embodiment

Next, a conductor length measurement device 10 according to a second preferred embodiment of the present invention will be described. Compositions that are the same as or comparable to those of the first preferred embodiment are labeled with the same symbols and explanation of such is omitted or abbreviated.

Figure 10:
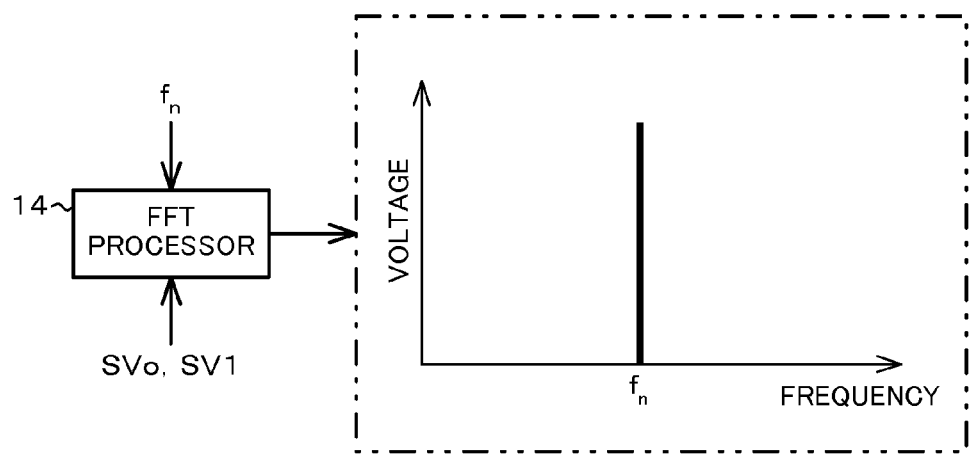
FIG. 10 is a drawing schematically showing the input into the FFT processor and the output from the FFT processor according to a second preferred embodiment.

With the conductor length measurement device 10 according to this preferred embodiment, the FFT processor 14 executes a different process from the process executed by the FFT processor 14 according to the first preferred embodiment. FIG. 10 is a drawing schematically showing the input into the FFT processor 14 and the output from the FFT processor 14. As shown in FIG. 10, a voltage signal SVo and an voltage signal SV1 output from receivers are input into the FFT processor 14, along with information relating to a frequency $f_n$ communicated from the controller 12.

The FFT processor 14 executes a filtering process on the voltage signals SVo and SV1 based on the frequency $f_n$ communicated from the controller 12. Through this, the voltage levels of the voltage signals SVo and SV1 with respect to the frequency $f_n$ are detected, as shown in FIG. 10.

Next, the usage method and measurement action of the conductor length measurement device 10 according to this preferred embodiment are explained.

Figure 4:
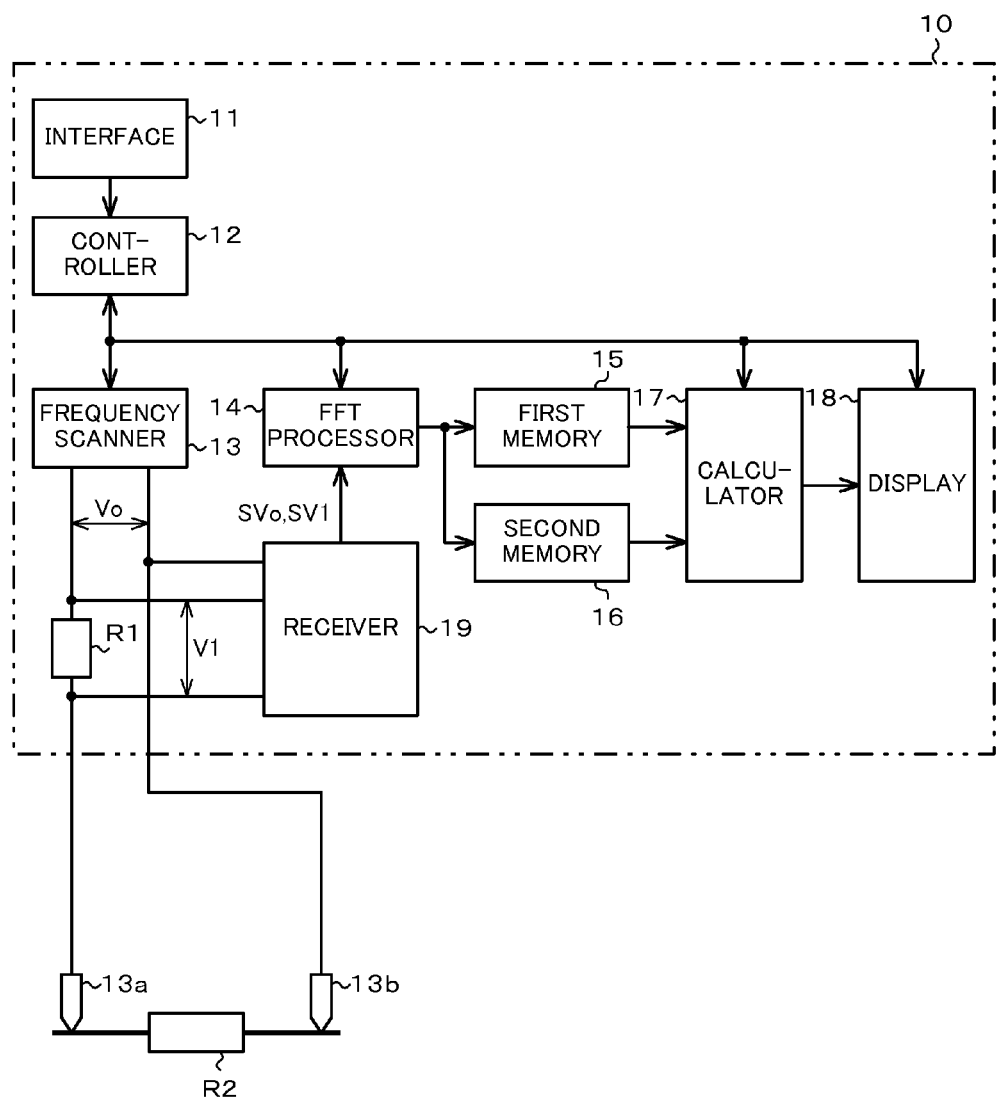
FIG. 4 is a drawing showing the conductor length measurement device and a resistor as a measurement target.

When a measurement is made by the conductor length measurement device 10, the probes 13a and 13b of the conductor length measurement device 10 are first connected to both ends of a resistor R2 of known resistance, as shown in FIG. 4. Furthermore, a measurement preparation process command is input into the controller 12 via the interface 11.

When the measurement preparation process command is received, the controller 12 commands the frequency scanner 13 to impress an output voltage Vo of frequency f. Through this, the output voltage Vo shown in FIG. 2 is impressed to the resistor R1 and the resistor R2 connected in series.

Next, the controller 12 communicates information relating to the frequency f to the FFT processor 14. Through this, when the output voltage Vo of frequency f is impressed, the FFT processor 14 executes a filtering process on the voltage signal SV1 output from the receiver 19 in accordance with the potential difference V1 across the two ends of the resistor R1. This filtering process is accomplished in a frequency bandwidth where errors related to the various frequencies of the FFT processor 14, the frequency scanner 13 and the receiver 19 are taken into consideration.

Next, the controller 12 commands the frequency scanner 13 to impress an output voltage Vo of frequency f+Δf, and also communicates information relating to the frequency f+Δf to the FFT processor 14. When the output voltage Vo of frequency f+ΔF is impressed, the FFT processor 14 executes the filtering process for the voltage signal SV1 output from the receiver 19 in accordance with the potential difference V1 across the two ends of the resistor R1.

Figure 11:
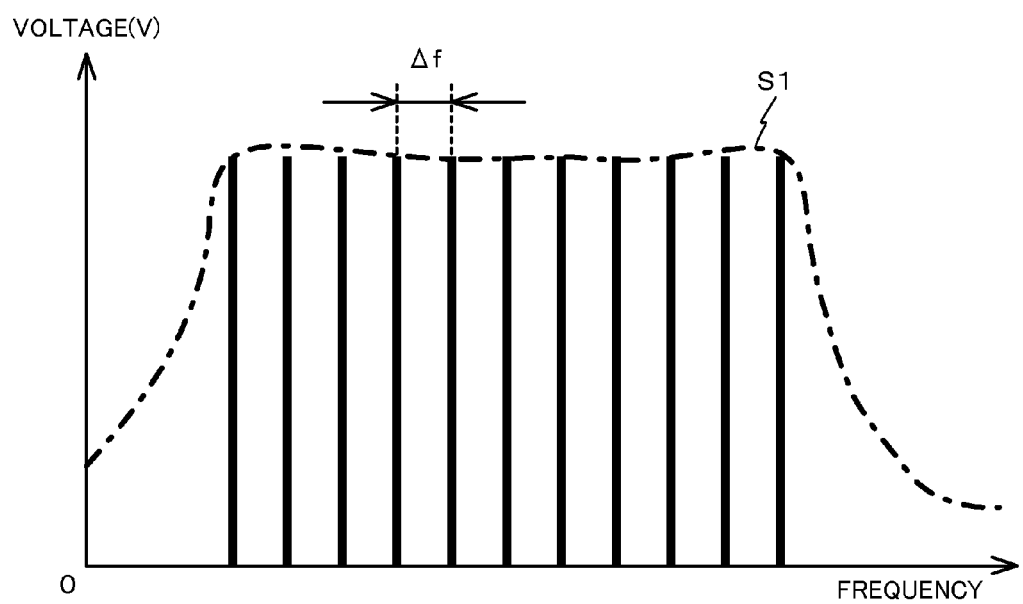
FIG. 11 is a graph for explaining the voltage level of the base wave component and the high harmonic wave component of a voltage signal corresponding to the potential difference across the two ends of the resistor.

Following this, the controller 12 successively commands the frequency scanner 13 to impress output voltages Vo of frequencies f+n·Δf and also successively communicates information relating to the frequencies f+n·Δf to the FFT processor 14. Here, n is an integer 2 or larger. Through this, when output voltages Vo of frequencies f+n·Δf are impressed, the FFT processor successively executes filtering processes for the voltage signals SV1 output from the receiver 19 in accordance with the potential differences V1 across the two ends of the resistor R1. As a result, the properties shown in the bar graph of FIG. 11 are successively computed. Furthermore, these computation results are successively stored in the first memory 15. The bar graph of FIG. 11 shows the filtering process results of the voltage signals SV1 corresponding to the potential differences V1 across the two ends of the resistor R1.

When execution of the filtering process for the voltage signals SV1 corresponding to the potential differences V1 across the two ends of the resistor R1 is concluded, the controller 12 commands the calculator 17 to compute the frequency spectrum curve S1. The calculator 17 calculates the frequency spectrum curve S1 using the filtering process results stored in the first memory 15.

When generation of information relating to the frequency spectrum curve S1 is concluded through the above-described process, the probes 13a and 13b of the conductor length measurement device 10 are removed from the resistor R2. Next, the probes 13a and 13b are respectively connected to the supply copper piping 23a and the return copper piping 23b comprising the piping 23, as shown in FIG. 1. Furthermore, a measurement process command is input to the controller 12 via the interface 11.

When the measurement command is received, the controller 12 commands the frequency scanner 13 to impress an output voltage Vo of frequency f. Through this, the output voltage Vo shown in FIG. 2 is impressed to the resistor R1 and the piping 23 connected in series.

Next, the controller 12 communicates information related to the frequency f to the FFT processor 14. Through this, when the output voltage Vo of frequency f is impressed, the FFT processor 14 executes a filtering process on the voltage signal SV1 output from the receiver 19 in accordance with the potential difference V1 across the two ends of the resistor R1.

Next, the controller 12 commands the frequency scanner 13 to impress an output voltage Vo of frequency f+Δf, and also communicates information relating to the frequency f+Δf to the FFT processor 14. When the output voltage Vo of frequency f+ΔF is impressed, the FFT processor 14 executes the filtering process for the voltage signal SV1 output from the receiver 19 in accordance with the potential difference V1 across the two ends of the resistor R1.

Following this, the controller 12 successively commands the frequency scanner 13 to impress output voltages Vo of frequencies f+n·Δf and also successively communicates information relating to the frequencies f+n·Δf to the FFT processor 14. Here, n is an integer 2 or larger. Through this, when output voltages Vo of frequencies f+n·Δf are impressed, the FFT processor 14 successively executes filtering processes for the voltage signals SV1 output from the receiver 19 in accordance with the potential differences V1 across the two ends of the resistor R1. Furthermore, these computation results are successively stored in the second memory 16.

When execution of the filtering process for the voltage signals SV1 corresponding to the potential differences V1 across the two ends of the resistor R1 is concluded, the controller 12 commands the calculator 17 to compute the frequency spectrum curve S2. The calculator 17 calculates the frequency spectrum curve S2 using the filtering process results stored in the second memory 16.

When computation of the frequency spectrum curve S2 concludes, the controller 12 commands the calculator 17 to compute the total length of the piping 23.

Upon receiving the computation command from the controller 12, the calculator 17 executes a computation process for the total length of the piping 23. The calculator first computes the characteristic curve S3 shown in FIG. 7 by subtracting the voltage level indicated by the frequency spectrum curve S1 (see FIG. 11) from the voltage level indicated by the frequency spectrum curve S2 (see FIG. 6). This characteristic curve S3 is a curve indicating the frequency characteristics of the piping 23.

Next, the calculator 17 specifies the resonant frequencies of the piping 23 based on this characteristic curve S3. Here, the frequencies f1, f2 and f3 are specified as frequencies corresponding to the minima of the characteristic curve S3.

Next, the calculator 17 computes the total length of the piping 23 using the above-described equation (1). Upon computing the total length of the piping 23 using the above-described equation (1), the calculator 17 outputs the computation results to the display 18.

When the computation results are output from the calculator 17, the controller 12 commands the display 18 to display the computation results. Through this, the total length of the piping 23 is displayed on the display 18.

As explained above, with this preferred embodiment the probes 13a and 13b of the conductor length measurement device 10 are connected to the piping 23 and the output voltage Vo is impressed to the piping 23 via these probes 13a and 13b. Next, the frequency spectrum curve S2 is computed by executing a filtering process. Furthermore, the resonant frequencies of the piping 23 are specified from this frequency spectrum curve S2, and by executing the computations shown in the above-described equation (1) for these resonant frequencies, the total length of the piping 23 is computed. Consequently, it is possible to easily measure the total length of the piping 23 without knowing the layout of the piping 23 and installing instruments and/or the like necessary for measurements, for example, to the ends of each branch.

Third Preferred Embodiment

Next, a conductor length measurement device 10 according to a third preferred embodiment of the present invention will be explained. Compositions that are the same as or comparable to those of the above-described preferred embodiments are labeled with the same symbols and explanation of such is omitted or abbreviated.

Figure 12:
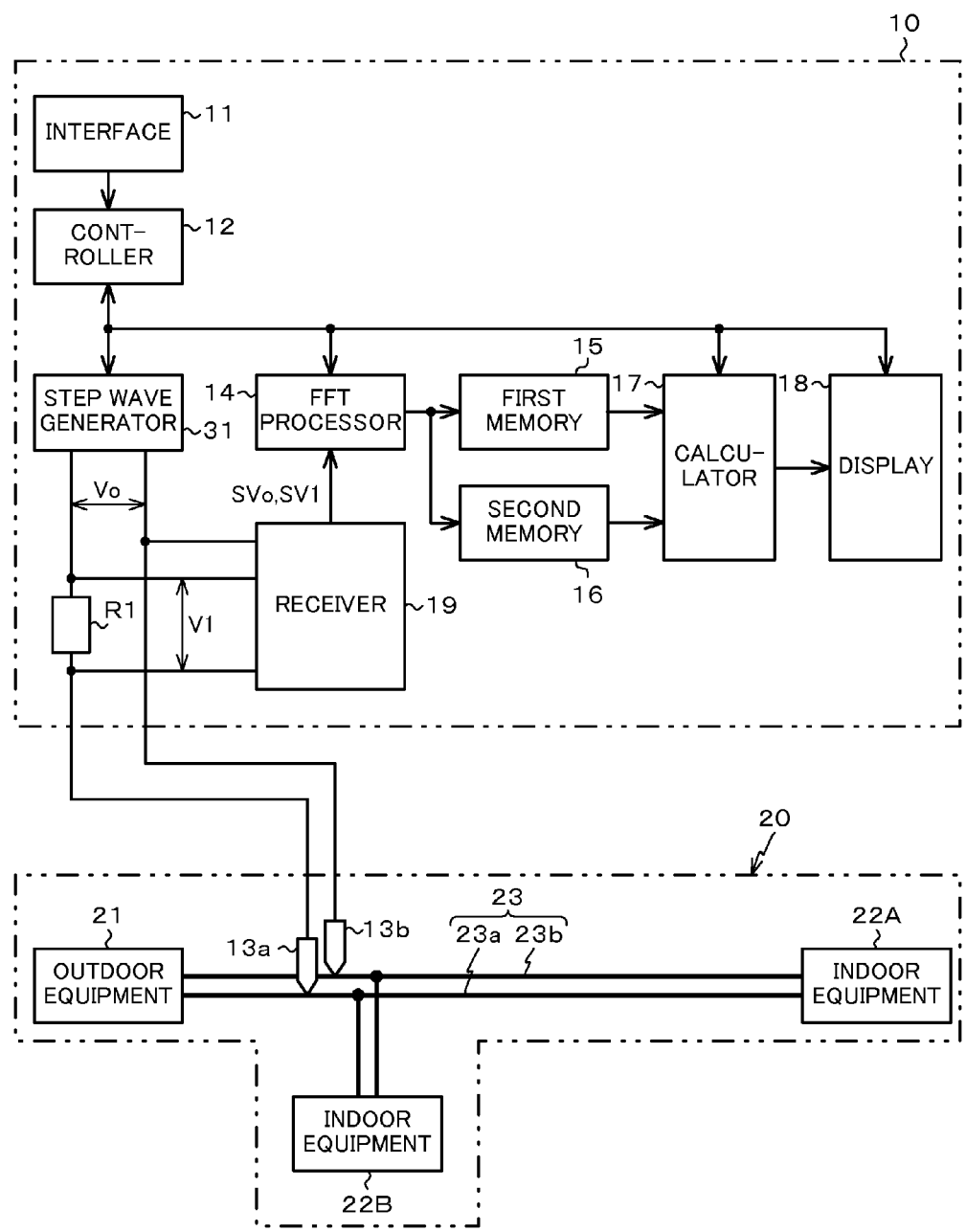
FIG. 12 is a block diagram of a conductor length measurement device according to a third preferred embodiment.

FIG. 12 is a block diagram of a conductor length measurement device 10 according to the third preferred embodiment. As shown in FIG. 12, the conductor length measurement device 10 according to this preferred embodiment differs from the conductor length measurement device 10 according to the above-described preferred embodiments in being provided with a step wave generator 31 in place of the frequency scanner 13.

The step wave generator 31 is a device with a well-known internal impedance and impresses an output voltage Vo with a square waveform on a measurement target. This step wave generator 31 is connected to the supply copper piping 23a via the resistor R1 and the probe 13a, and is connected to the return copper piping 23b via the probe 13b. Through this, the resistor R1 and the piping 23 are connected in series.

Figure 13:
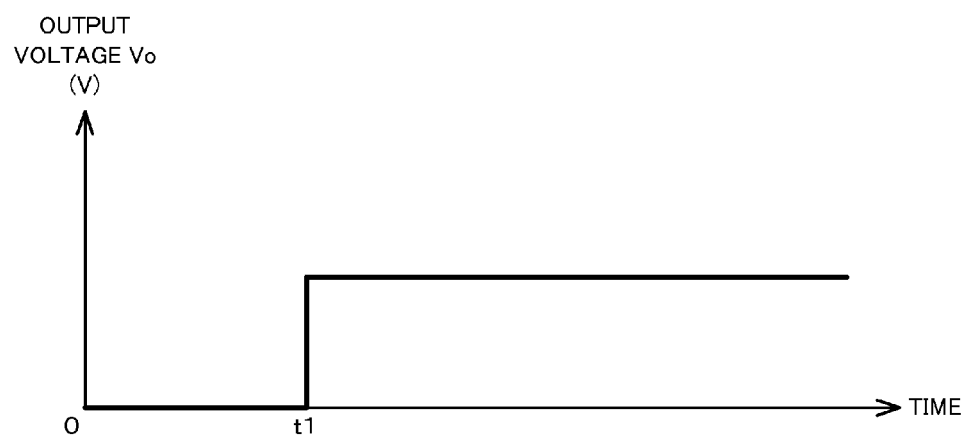
FIG. 13 is a drawing showing the change with time in the output voltage output from a step wave generator.

FIG. 13 is a drawing showing the change over time in the output voltage Vo output from the step wave generator 31. The step wave generator 31 impresses the output voltage Vo that becomes high-level at time t1 between the resistor R1 and the piping 23. This output voltage Vo is divided so as to be proportional to the impedances of the resistor R1 and piping 23 connected in series.

Figure 14:
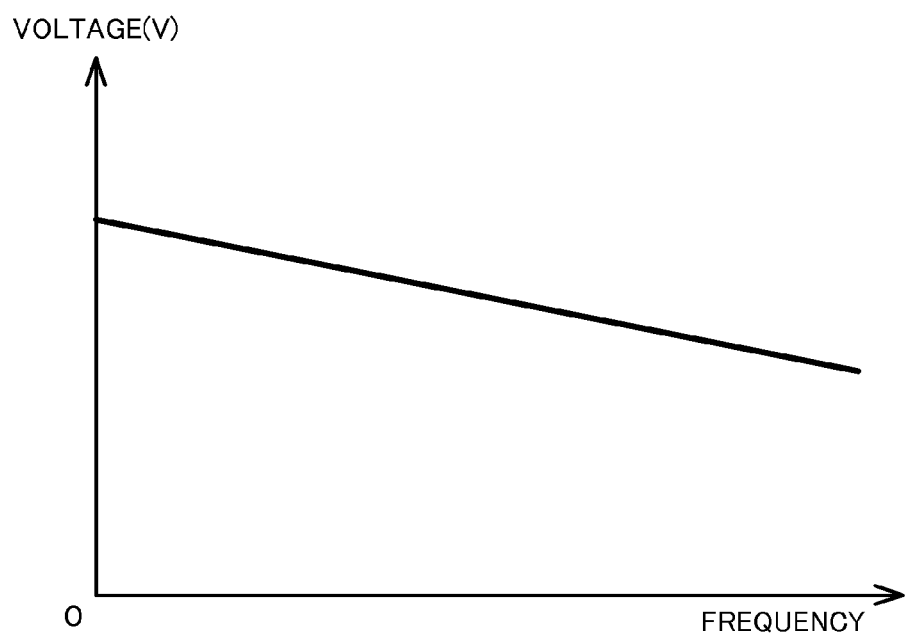
FIG. 14 is a drawing showing the frequency spectrum of the output voltage output from the step wave generator.

FIG. 14 is a drawing showing the frequency spectrum of the output voltage Vo output from the step wave generator 31.

As indicated by the solid line in FIG. 14, the output voltage Vo includes a direct current component and various alternating current components of various frequencies.

Next, the usage method and measurement action of the conductor length measurement device 10 comprised as described above are explained.

When measurements are to be made by the conductor length measurement device 10, first the probes 13a and 13b of the conductor length measurement device 10 are respectively connected to the two ends of a resistor R2 of known resistance, as shown in FIG. 4. Furthermore, a measurement preparation process command is input into the controller 12 via the interface 11.

When a measurement preparation process command is received, the controller 12 commands the step wave generator 31 to impress an output voltage Vo. Through this, the output voltage Vo shown in FIG. 13 is impressed to the resistor R1 and the resistor R2 connected in series.

Next, the controller 12 commands execution of the FFT process by the FFT processor 14. Through this, the FFT process for the output signal SV1 output from the receiver 19 is executed by the FFT processor 14 in accordance with the potential difference V1 across the two ends of the resistor R1 when the output voltage Vo is impressed. Process results from the FFT processor 14 are successively stored in the first memory 15.

Figure 15:
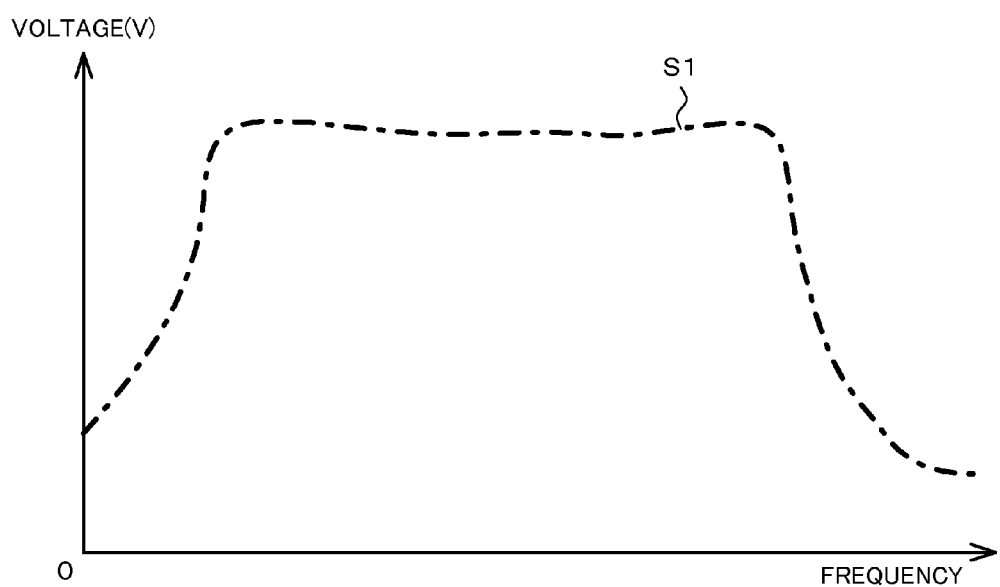
FIG. 15 is a drawing showing one example of the frequency spectrum curve.

When execution of the FFT process for the output signal SV1 corresponding to the potential difference V1 across the two ends of the resistor R1 is concluded, the controller 12 commands the calculator 17 to compute the frequency spectrum curve S1. The calculator 17 computes the frequency spectrum curve S1 showing the voltage level at each frequency for the voltage signal SV1 using the results of the FFT process stored in the first memory 15. FIG. 15 is a drawing showing one example of the frequency spectrum curve S1. This frequency spectrum curve S1 shows the output properties of the measurement system of the conductor length measurement device 10. Taking the impedance properties unique to the measurement system found from these output properties, it is possible to accurately take measurements of conductor length.

After the above-described processes are concluded, the probes 13a and 13b of the conductor length measurement device 10 are removed from the resistor R2. Next, the probes 13a and 13b are respectively connected to the supply copper piping 23a and the return copper piping 23b comprising the piping 23, as shown in FIG. 12. Furthermore, a measurement process command is input into the controller 12 via the interface 11.

When a measurement command is received, the controller 12 commands the frequency scanner 13 to impress the output voltage Vo. Through this, the output voltage Vo shown in FIG. 13 is impressed to the resistor R1 and the piping 23 connected in series.

Next, the controller 12 commands the FFT processor 14 to execute the FFT process. Through this, the FFT process for the output signal SV1 output from the receiver 19 is executed by the FFT processor 14 in accordance with the potential difference V1 across the two ends of the resistor R1 when the output voltage Vo is impressed. Process results from the FFT processor 14 are successively stored in the second memory 16.

When execution of the FFT process for the output signal SV1 corresponding to the potential difference V1 across the two ends of the resistor R1 is concluded, the controller 12 commands the calculator 17 to compute the frequency spectrum curve S2. The calculator 17 computes the frequency spectrum curve S2 showing the voltage level at each frequency for the voltage signal SV1 using the results of the FFT process stored in the second memory 16. This frequency spectrum curve S2 is shown in FIG. 6, for example.

When computation of the frequency spectrum curve S2 is concluded, the controller 12 commands the calculator 17 to compute the total length of the piping 23.

When the computation command from the calculator 12 is received, the calculator 17 executes the process of computing the total length of the piping 23. The calculator computes the characteristic curve S3 shown in FIG. 7 by subtracting the voltage level indicated by the frequency spectrum curve S1 (see FIG. 15) from the voltage level indicated by the frequency spectrum curve S2 (see FIG. 6). This characteristic curve S3 is a curve showing the frequency characteristics of the piping 23.

Next, the calculator 17 specifies the resonant frequencies of the piping 23 based on the characteristic curve S3. Here, the frequencies f1, f2 and f3 are specified as frequencies corresponding to the minima of the characteristic curve S3.

Next, the calculator 17 computes the total length of the piping 23 using the above-described equation (1). Upon computing the total length of the piping 23 using the above-described equation (1), the calculator 17 outputs the computation results to the display 18.

When the computation results are output from the calculator 17, the controller 12 commands the display 18 to display the computation results. Through this, the total length of the piping 23 is displayed on the display 18.

As explained above, with this preferred embodiment the probes 13a and 13b of the conductor length measurement device 10 are connected to the piping 23 and the output voltage Vo is impressed to the piping 23 via these probes 13a and 13b. Next, the frequency spectrum curve S2 is computed by executing an FFT process. Furthermore, the resonant frequencies of the piping 23 are specified from this frequency spectrum curve S2, and by executing the computations shown in the above-described equation (1) for these resonant frequencies, the total length of the piping 23 is computed. Consequently, it is possible to easily measure the total length of the piping 23 without knowing the layout of the piping 23 and installing instruments and/or the like necessary for measurements, for example, to the ends of each branch.

In the conductor length measurement device 10 according to this preferred embodiment, a step wave generator 31 was used in place of the frequency scanner 13. Consequently, it is possible to measure the conductor length of the piping 23 without conducting the process of scanning frequencies. Accordingly, it is possible to measure the conductor length of the piping 23 in a short time.

In addition, because measurement of the conductor length can be accomplished in a short time, it is possible to easily make multiple measurements for example near electrical equipment and inside the electrical room where the effects of electrical noise are readily experienced. Accordingly, it is easy to compute the conductor length and high-precision measurements are possible based on the average value of the measurement results.

With this preferred embodiment, the case described was one in which the output voltage Vo from the step wave generator 31 was a waveform that went to high level at t1. This is intended to be illustrative and not limiting, for it would be fine for the output voltage Vo output from the step wave generator 31 to be a square wave whose value changes cyclically. In this case, the basic frequency of the square wave may be determined so that the wavelength of the square wave is not greater than ¼ the electrical length λ of measurement target.

Figure 16:
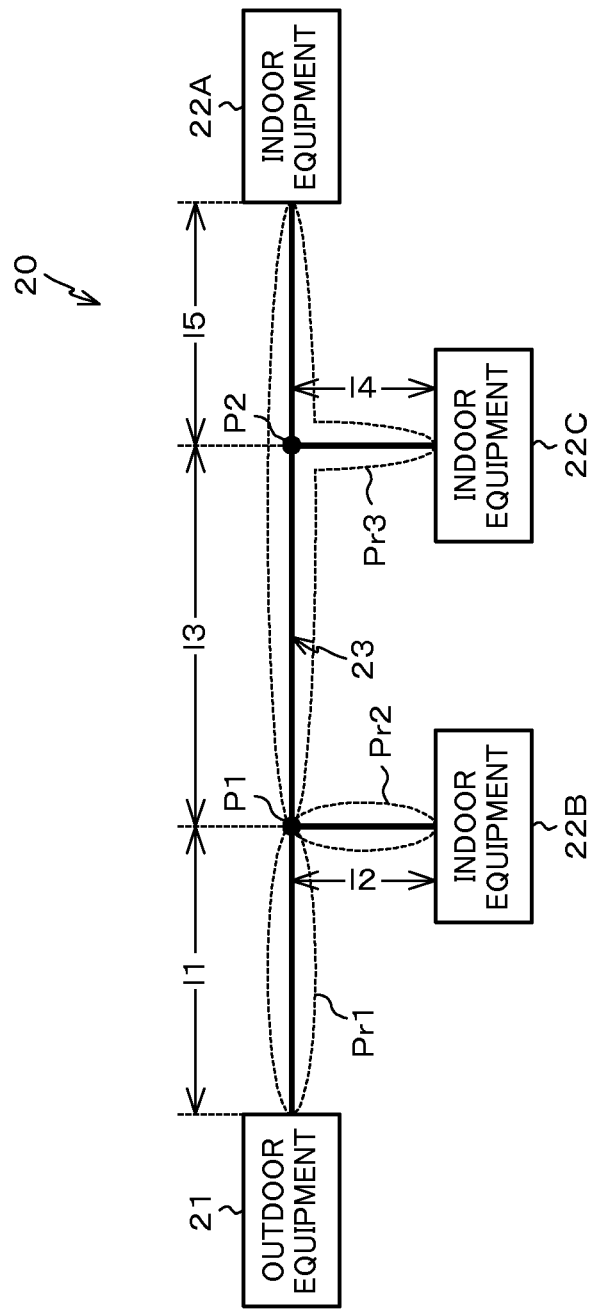
FIG. 16 is a drawing for defining the length of each branch of the piping.

The preferred embodiments of the present invention were described above, but these are intended to be illustrative and not limiting. For example, in the above-described preferred embodiments the case was described in which the piping 23 branches at a point P1, as shown in FIG. 8. This is intended to be illustrative and not limiting, for the conductor length measurement device 10 according to the above-described preferred embodiments can also measure the conductor length of piping 23 that branches as the two points P1 and P2, for example as shown in FIG. 16. In this case, the conductor length of the piping 23 is indicated by equation (24) below. In this equation, p expresses the number of branches and in this case is 2.

[Formula 22]

$$l_1 + l_2 + l_3 + l_4 + l_5 = \frac{300}{f_w^2} \sum f_n + \frac{p \cdot 150}{f_w} \quad (24)$$

Below, this above equation (24) is explained. The impedance Zt of the piping 23 is indicated by the below equation (25). In addition, A and B in equation (25) are respectively indicated by equations (26) and (27) below.

[Formula 23]

$$Zt = jZ_0 \frac{A}{B} \quad (25)$$

[Formula 24]

$$A = \tan\beta l_2 \times \tan\beta l_4 \times \tan\beta l_5 + \tan\beta l_2 \times \tan\beta l_3 \times \tan\beta l_4 + \\ \tan\beta l_2 \times \tan\beta l_3 \times \tan\beta l_5 + \tan\beta l_1 \times \tan\beta l_2 \times \tan\beta l_4 + \\ \tan\beta l_1 \times \tan\beta l_2 \times \tan\beta l_5 + \tan\beta l_1 \times \tan\beta l_4 \times \tan\beta l_5 + \\ \tan\beta l_1 \times \tan\beta l_3 \times \tan\beta l_4 + \tan\beta l_1 \times \tan\beta l_3 \times \tan\beta l_5 - \\ \tan\beta l_1 \times \tan\beta l_2 \times \tan\beta l_3 \times \tan\beta l_4 \times \tan\beta l_5 \quad (26)$$

[Formula 25]

$$B = \tan\beta l_2 \times \tan\beta l_4 + \tan\beta l_2 \times \tan\beta l_5 + \\ \tan\beta l_4 \times \tan\beta l_5 + \tan\beta l_3 \times \tan\beta l_4 + \\ \tan\beta l_3 \times \tan\beta l_5 - \tan\beta l_2 \times \tan\beta l_3 \times \tan\beta l_4 \times \tan\beta l_5 - \\ \tan\beta l_1 \times \tan\beta l_2 \times \tan\beta l_4 \times \tan\beta l_5 - \\ \tan\beta l_1 \times \tan\beta l_2 \times \tan\beta l_3 \times \tan\beta l_4 - \tan\beta l_1 \times \tan\beta l_2 \times \tan\beta l_3 \times \tan\beta l_5 \quad (27)$$

When the frequency of the output voltage Vo matches a resonant frequency of the piping 23, the impedance Zt of the piping 23 diverges. In this case, the numerator on the right side of the above equation (25) becomes infinitely large, or the denominator goes to zero. However, in the above equation (25), the numerator does not become infinitely large, so the denominator going to zero (B=0) is the condition for the impedance Zt to diverge.

Equation (27) is in the form of subtracting the four-dimensional term of the tangent tan (tan βl×tan βl×tan βl×tan βl) from the two-dimensional term of the tangent tan (tan βl×tan βl). Consequently, a solution by dividing by the three-dimensional term of the tangent tan is anticipated. However, equation (27) contains five different tan terms, so as explained in the first preferred embodiment, it is impossible to convert equation (25) into an equation expressed as the sum of tan terms. Accordingly, it is difficult to analytically derive a solution to the equation (27).

Hence, consider the piping 23 shown in FIG. 16 as partitioned into a first part Pr1 from the outdoor equipment 21 to the point P1, a second part Pr2 from the point P1 to the indoor equipment 22B and a third part Pr3 combining the part from the point P1 to the indoor equipment 22A and from the point P2 to the indoor equipment. The third part Pr3 has a complex composition including branching points, but the terms corresponding to the third part Pr3 in B of equation (27) can be thought of as a tan term whose period is complex. The significance of this period being complex is that although $\tan \beta l_N$ repeatedly goes from $-\infty\infty$ to $\infty$ and monotonically increases, the repeating pattern is irregular.

From the above, equation (28) below can be conjectured by applying the computation equation for when there is a branch only at point P1 as explained in the first preferred embodiment to the term corresponding to the third part Pr3.

[Formula 26]

$$\sum \beta_n = \sum A_n + \sum B_n + \sum C_n = \qquad (28)$$
$$\sum_{n=0}^{N_2} \frac{\pi}{l_2} n + \left( \sum_{n=0}^{N_2} \frac{\pi}{l_4} n + \sum_{n=0}^{N_3} \frac{\pi}{l_5} n + \sum_{n=0}^{N_1} \left( \frac{\pi}{l_3} + \frac{\pi}{2l_3} \right) \right) + \sum_{n=0}^{N_1} \left( \frac{\pi}{l_1} n + \frac{\pi}{2l_1} \right) =$$
$$\frac{W^2}{2\pi} (l_1 + l_2 + l_3 + l_4 + l_5) - 2 \cdot \frac{W}{2}$$

From this equation (28), equation (29) below is established when there are p branch points PN. Furthermore, this leads to equation (30).

[Formula 27]

$$\sum \beta_n = \frac{W^2}{2\pi} \sum l_m - \frac{p \cdot W}{2} \qquad (29)$$

[Formula 28]

$$\sum l_m = \frac{2\pi}{W^2} \sum \beta - \frac{p \cdot \pi}{W} \qquad (30)$$

Here, because the conductor length of the piping 23 is computed based on the resonant frequency of the piping 23, the relationship between β and f is indicated by equation (31) below.

[Formula 29]

$$\beta = \frac{\pi \cdot f}{150} \qquad (31)$$

Accordingly, the estimation equation indicated by equation (24) above can be found from equations (30) and (31) above. By using equation (24), it is possible to measure the conductor length of the piping with sufficient precision by using the conductor length measurement device 10 according to this preferred embodiment even when the piping 23 branches in multiple places.

In addition, with the above-described preferred embodiment, the frequency spectrum curve S1 showing the frequency characteristics of the conductor length measurement device 10 is computed by connecting the conductor length measurement device 10 to the resistor R2. This is intended to be illustrative and not limiting, for the spectrum curve S1 showing the frequency characteristics of the conductor length measurement device 10 may be computed with the probes 13a and 13b of the conductor length measurement device 10 in an open state, or with the probes 13a and 13b of the conductor length measurement device 10 in a short-circuit state. By specifying the impedance unique to the measurement system based on the frequency characteristics of the conductor length measurement device 10 with the probes 13a and 13b connected to the resistor R2, open or short-circuited, and accomplishing correction taking that impedance into consideration, it is possible to accurately measure the impedance of the measurement target.

With the above-described preferred embodiments, the frequency scanner 13 was a digital frequency synthesizer. However, this is intended to be illustrative and not limiting, for the frequency scanner 13 may be a device capable of scanning arbitrary frequencies with prescribed steps, as exemplified by a VFO (Variable-Frequency Oscillator) that scans scanned frequencies using voltage signals, for example.

In addition, as the receiver 19 a digital oscilloscope can be used, for example, but it would be fine to use a device that can directly measure voltage characteristics of frequencies.

With the above-described preferred embodiments, the explanation used the piping 23 of an air conditioning device. However, this is intended to be illustrative and not limiting, for the conductor length measurement device according to the present invention can measure the total length of a conductor having a physical structure that can be considered based on transmission theory, such as electrical wiring or communication wiring composed of a pair of conductors.

Figure 17:
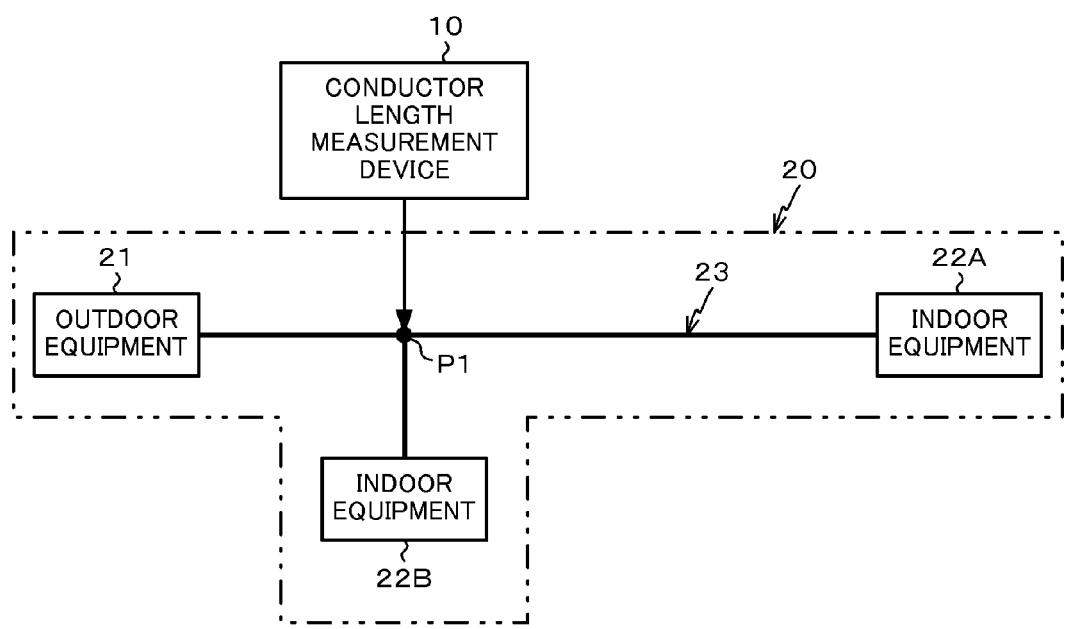
FIG. 17 is a drawing displaying another example of the connection points between the piping and the conductor length measurement device.

The conductor length measurement device 10 according to the above-described preferred embodiments can also be connected to the branch point P1 of the conductor as shown in FIG. 17, for example, without selecting the connection location to the conductor. In general, the branch points and terminuses of the conductor may be exposed to the outside. Consequently, by using the conductor length measurement device of the present invention, it is possible to accomplish measurement of the total length of the conductor without inflicting damage on insulating sheets and/or the like covering the piping 23.

Figure 18:
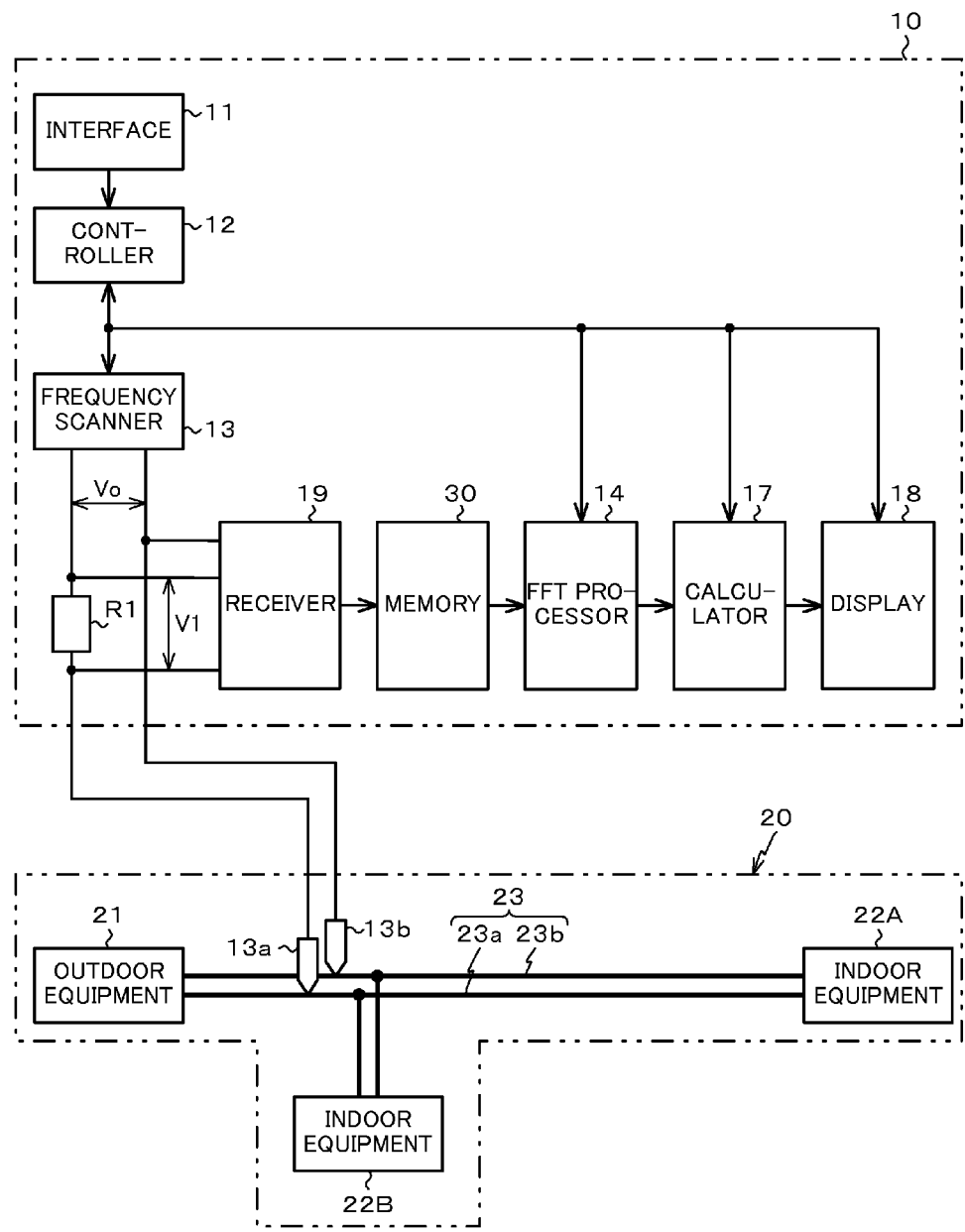
FIG. 18 is a drawing showing a variation of the conductor length measurement device.

With the above-described preferred embodiments, the explanation was for the case in which the process results from the FFT processor were stored in the first memory 15 and the second memory 16. However, this is intended to be illustrative and not limiting, for a memory 30 may be positioned between the receiver 19 and the FFT processor 14, for example as shown in FIG. 18, and information output from the receiver may be accumulated in the memory 30. In this case, information accumulated in the memory 30 undergoes the FFT process by the FFT processor 14. In this case, the calculator 17 computes conductor length based on information output from the FFT processor 14.

Having described and illustrated the principles of this application by reference to one or more preferred embodiments, it should be apparent that the preferred embodiments may be modified in arrangement and detail without departing from the principles disclosed herein and that it is intended that the application be construed as including all such modifications and variations insofar as they come within the spirit and scope of the subject matter disclosed herein.

This application claims the benefit of Japanese Patent Application No. 2010-186644, filed on Aug. 23, 2010, the entire disclosure of which is incorporated by reference herein.

INDUSTRIAL APPLICABILITY

The conductor length measurement device and conductor length measurement method of the present invention are suitable for measurement of the total length of a conductor.

DESCRIPTION OF REFERENCE NUMERALS

10 Conductor length measurement device
11 Interface
12 Controller
13 Frequency scanner
13a Probe
13b Probe
14 FFT processor
15 First memory
16 Second memory
17 Calculator
18 Display
19 Receiver
20 Air conditioning system
21 Outdoor equipment
22A-22C Indoor equipment
23 Piping
23a Supply copper piping
23b Return copper piping
30 Memory
31 Step wave generator
P1 Branch point
Pr1 First part
Pr2 Second part
Pr3 Third part
R1, R2 Resistor
S0, S1, S2 Frequency spectrum curve
S3 Characteristic curve
SV0, SV1 Voltage signal
Vo Output voltage

The invention claimed is:

1. A conductor length measurement device, comprising:
a measurement unit for measuring frequency characteristics of a coupled conductor by impressing a voltage to the conductor; and
a computation unit for specifying resonant frequencies of the conductor from the frequency characteristics, and computing the total length L of the conductor by making a computation in accordance with the following estimation equation, with the conductor serving as a lossless line, $$L = \frac{300}{f_w^2}\Sigma f_n + \frac{p \cdot 150}{f_w},$$

where fn represents the resonant frequencies, fw represents a frequency range and p represents the number of branches of the conductor, wherein
an end of the conductor is short-circuited, and
p is equal to or greater than two.

2. The conductor length measurement device according to claim 1, wherein the measurement unit has a voltage impressing unit for impressing an alternating-current voltage to the conductor while causing the frequency to change.

3. The conductor length measurement device according to claim 2, wherein the alternating current voltage contains a high harmonic wave component.

4. The conductor length measurement device according to claim 1, wherein the measurement unit has a voltage impressing unit for impressing a step voltage to the conductor.

5. The conductor length measurement device according to claim 1, wherein the measurement unit measures the frequencies characteristics of a voltage signal corresponding to the potential difference across the two ends of a resistor, when a voltage is impressed to the resistor and the conductor connected in series.

6. The conductor length measurement device according to claim 5, wherein the measurement unit executes an FFT process on the voltage signal.

7. The conductor length measurement device according to claim 1, wherein the conductor is piping for circulating a prescribed coolant.

8. The conductor length measurement device according to claim 1, wherein the conductor is electrical wiring to an end of which is connected electrical equipment with any impedance.

9. The conductor length measurement device according to claim 8, wherein the impedance of the conductor and the impedance of the electrical equipment do not match.

10. The conductor length measurement device according to claim 1, wherein the conductor is covered by an insulating material.

11. The conductor length measurement device according to claim 1, further comprising a display unit for displaying the total length of the conductor computed by the computation unit.

12. A conductor length measurement method, including:
a process for impressing a voltage to a resistor and coupled conductor connected in series;
a process for measuring frequency characteristics of a voltage signal corresponding to a potential difference across the two ends of the resistor;
a process for specifying resonant frequencies of the conductor based on the frequency characteristics; and
a process for computing the total length L of the conductor by making a computation in accordance with the following estimation equation, with the conductor serving as a lossless line, $$L = \frac{300}{f_w^2}\Sigma f_n + \frac{p \cdot 150}{f_w},$$

where fn represents the resonant frequencies, fw represents a frequency range and p represents the number of branches of the conductor, wherein
an end of the conductor is short-circuited, and
p is equal to or greater than two.

* * * * *